Figure 1:
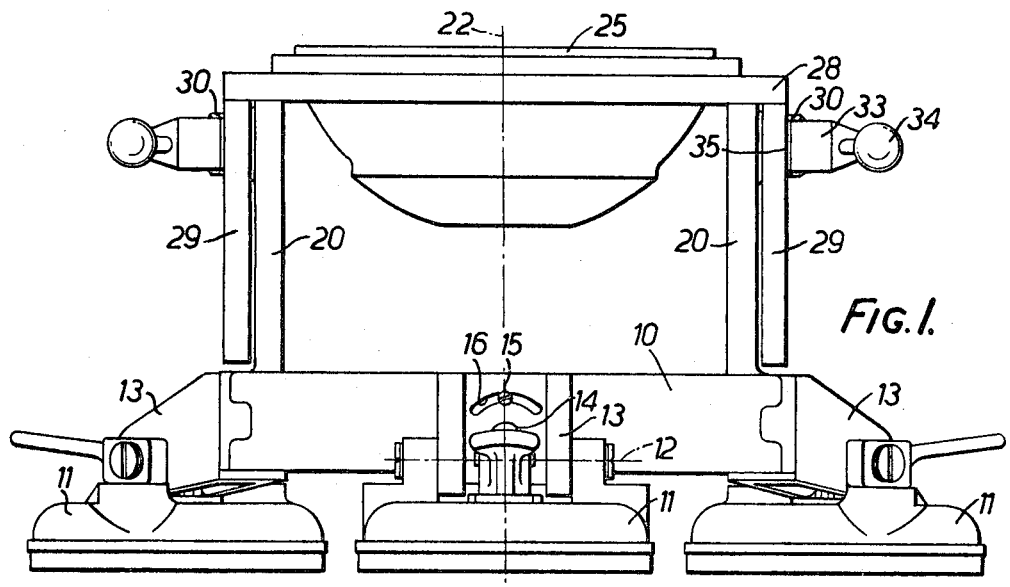

United States Patent

Samuelson

[15] 3,638,889
[45] Feb. 1, 1972

[54] MOUNTING BRACKETS FOR CAMERAS AND OTHER OPTICAL INSTRUMENTS

[72] Inventor: David W. Samuelson, London, England
[73] Assignee: Samuelson Film Service Limited, London, England
[22] Filed: Dec. 23, 1969
[21] Appl. No.: 887,618

[30] Foreign Application Priority Data

Jan. 10, 1969  Great Britain.......................1,570/69

[52] U.S. Cl. ..............................248/206 R, 95/86, 248/185, 248/291
[51] Int. Cl. .....................................................G03b 17/56
[58] Field of Search.................248/206, 178, 179, 183, 184, 248/185, 291, 284; 95/86

[56] References Cited

UNITED STATES PATENTS

| 2,481,717 | 9/1949 | Blair | 95/86 X |
| 2,602,617 | 7/1952 | Muth | 248/206 X |
| 2,668,682 | 2/1954 | Dalton | 95/86 X |

*Primary Examiner*—J. Franklin Foss
*Attorney*—Watson, Cole, Grindle & Watson

[57] ABSTRACT

The invention relates to an adjustable mounting bracket for a photographic or television camera or other optical instrument designed to enable the instrument to be supported on any vertical inclined or horizontal surface whether flat or curved, for the purpose of sighting or shooting.

2 Claims, 3 Drawing Figures

MOUNTING BRACKETS FOR CAMERAS AND OTHER OPTICAL INSTRUMENTS

This invention relates to adjustable mounting brackets for cameras, for example cine or television cameras, or for other optical instruments such as telescopes or theodolites, and is concerned with providing a mounting bracket capable of being attached to a horizontal, vertical or inclined supporting surface, which may be flat or slightly curved or irregular, and of supporting a camera or other instrument in a vertical or tilted attitude for use while so attached to the supporting surface. For example the supporting surface may comprise the vertical side of a wall, the inclined surface of a roof of a building, or a surface of a part of a vehicle such as a near-horizontal part of the roof or bonnet.

According to the present invention, an adjustable mounting bracket for a camera or other optical instrument comprises a base to which are attached a plurality of suction pads adapted to grip by suction a smooth vertical or inclined surface, and an instrument mounting adjustably attached to the base by means permitting the attitude of the instrument mounting to be adjusted by tilting relatively to the base.

Preferably each of the suction pads is pivotally mounted on the base by pivot means permitting rocking about each of two pivotal axes at right angles to one another, thereby facilitating the attachment of the base to a slightly curved or otherwise nonplanar supporting surface. There may be three such suction pads in a triangulated disposition.

In another arrangement, the instrument mounting is pivotally attached to the base, and is angularly adjustable by tilting about its pivotal attachment, and which includes clamping means for clamping the instrument mounting at a desired angular attitude relatively to the base.

The invention according to another of its aspects comprises an adjustable mounting bracket for a camera, including a base having suction pad attachment means for attaching it by suction to a vertical or inclined surface, and a mounting for a camera, the mounting being pivotally mounted on the base and being angularly adjustable by tilting about a transverse pivotal axis relatively to the base, and clamping means for clamping the mounting platform in a desired attitude relatively to the base.

In a preferred form, the base comprises a frame or platform having three suction pads pivotally attached to its periphery in a triangulated disposition for attaching the base by suction to a supporting surface, which may be vertical, inclined or horizontal, with one side of the base close to the supporting surface, and having a bracket structure rigidly secured to and projecting from the opposite side of the base, the camera mounting being pivotally mounted on the bracket structure.

The camera mounting may have rigidly secured thereto at least one clamping plate formed with an arcuate slot centered on the pivotal axis of the camera mounting, and a screw clamp carried by the bracket structure is engaged in the slot, the screw clamp when tightened gripping the edge of the slot to clamp the clamping plate to the bracket structure and hence to clamp the camera mounting to the base in a given attitude.

For example the camera mounting may comprise a conventional universal mounting bowl to opposite sides of which are attached a pair of parallel quadrant-shaped mounting plates which are journaled in the bracket structure for pivotal movement about a pivotal axis perpendicular to the mounting plates, each of the mounting plates constituting a said slotted clamping plate and being provided with a screw clamp mounted on the bracket structure in engagement with its arcuate slot.

The mounting bracket may be constructed and arranged to provide a range of angular adjustment of the cameras mounting relatively to the base of at least 90° about the said pivotal axis.

Figure 2:
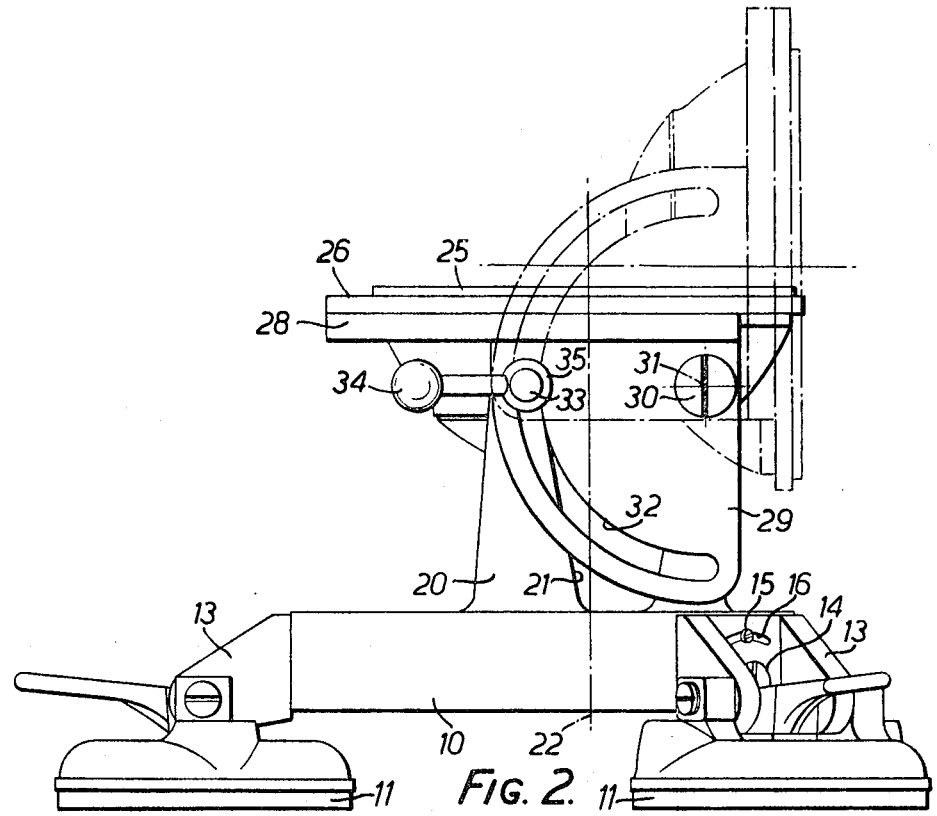
Figure 3:
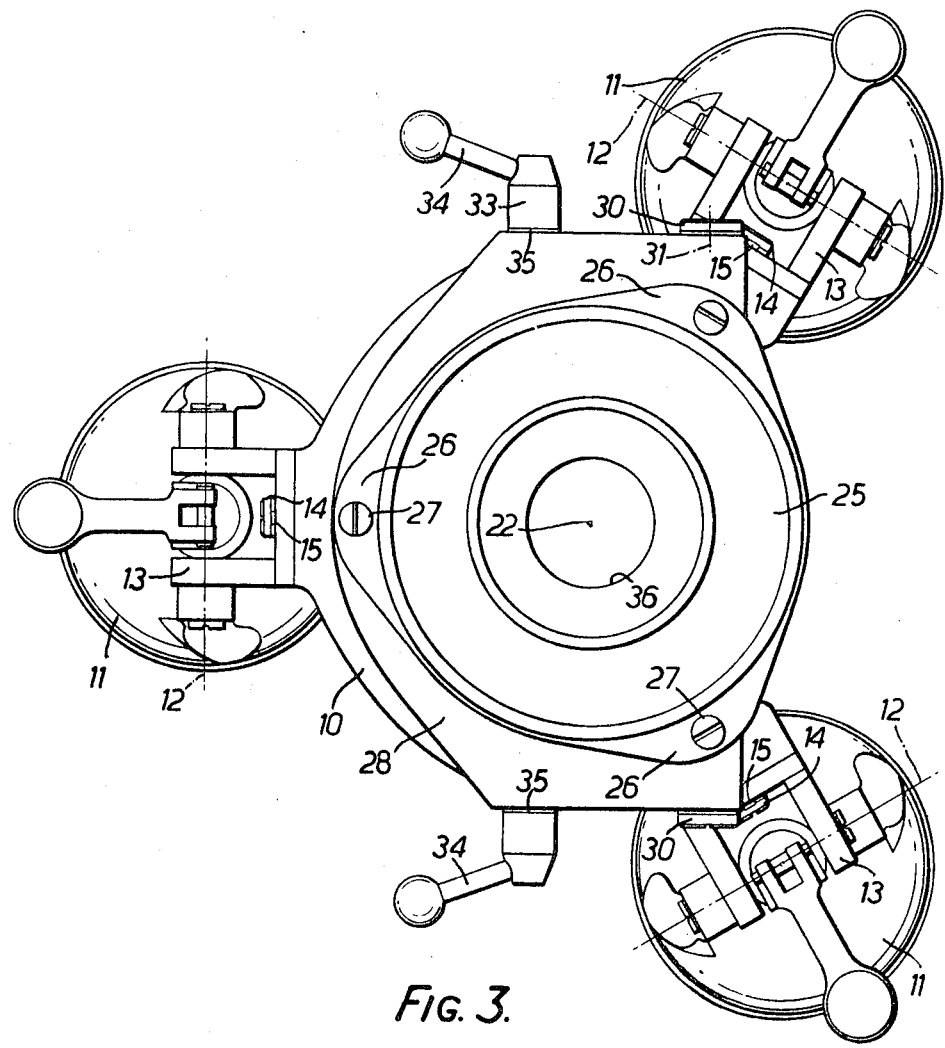

The invention may be carried into practice in various ways, but one specific embodiment will now be described by way of example with reference to the accompanying drawings, in which:

FIG. 1 is a front elevation of an adjustable mounting bracket for a cine camera,
FIG. 2 is a side elevation of the mounting bracket, and
FIG. 3 is a plan of the mounting bracket.

In the illustrated embodiment the mounting bracket comprises an annular base 10, to angularly spaced points on the periphery of which are attached three lever-actuated suction pads 11 of known form by means of which the base can be attached by suction to a smooth vertical or inclined supporting surface. Each suction pad 11 is journaled about a pivotal axis 12 in a supporting yoke 13, and each yoke 13 is pivoted by means of a radial pin 14 to the circumference of the base 10 for rocking about a radial axis relatively to the base. A clamping screw 15 is provided which engages in an arcuate slot 16 formed in each yoke 13 for clamping the yoke in a desired attitude relatively to the annular base 10.

The three suction pads 11 all face away from one side of the base 10, and protruding from the opposite face of the base are a pair of spaced parallel supporting plates 20 each formed with a deep central recess 21 which divides it into two fingerlike parts integral with or rigidly attached to the base. The supporting plates 20 extend parallel to the axis of symmetry 22 of the base 10 and provide a support for a mounting bowl 25 for a cine camera, or for a pan or tilt head on which a camera may be mounted. The bowl 25 has three lugs 26 formed at spaced points on its periphery, and is mounted by means of three screws 27 on a mounting plate 28 having a central circular aperture through which the lower part of the bowl projects. Rigidly secured to opposite ends of the mounting plate 28 are a pair of parallel quadrant plates 29 which extend outside of and are parallel and close to the support plates 20. The quadrant plates 29 are pivoted by means of coaxial pins 30 to the upper fingers of the two support plates 20 to enable the bowl to be tilted about the pivotal axis 31 of the pins 30 through an angle of at least 90° relatively to the base 10, between the position shown in firm lines in FIG. 2 in which the rim of the bowl is parallel to the face of the base 10, and the position shown in broken lines in FIG. 2 in which the rim of the bowl is perpendicular to the face of the base 10. Moreover each quadrant plate 29 is formed with an arcuate slot 32 coaxial with the pivotal axis 31. In each slot 32 is engaged a screw clamp 33 screwed into a threaded bore in the lower part of the adjacent support plate 20 and provided with an operating handle 34 and a clamping flange 35.

Thus it will be seen that the complete mounting bracket can be attached by means of the three suction pads 11 to a smooth horizontal, vertical or inclined surface, the rocking and pivotal mountings for the pads 11 enabling them to accommodate themselves to the surface whether the latter is curved or plane. With the base 10 thus attached to a supporting surface by the pads 11, the mounting bowl 25 can then be tilted into a horizontal position about the pivotal axis 31, and clamped in that position by means of the screw clamp 33. The bowl 25 is formed with a part-spherical interior to enable it to receive a cooperating bowl of a pan and tilt head, providing adjustment of the attitude of the tilt head and a cine camera mounting thereon. The bowl 25 is also provided with a central aperture 36 in its base to receive a clamping spindle by means of which a cine camera can be mounted on the bowl 25 either directly or by means of a pan head.

The mounting bracket described enables a cine camera to be supported with its axis vertical from a vertical or inclined surface such as the side of a vehicle, by means of the base 10 and clamping pads 11, the pivotal mounting of the bowl 25 enabling the tilt of the camera to be adjusted about a pivotal horizontal axis to accommodate the degree of inclination if any of the supporting surface.

It will be understood that the mounting bracket described and illustrated may be employed for mounting other kinds of camera for example a still camera or a television camera. Again it may be employed to support some other kind of optical instrument than a camera for example a telescope, a theodolite or a level, the instrument being attached to the mounting bowl 25 by means of a cooperating universal joint part, or otherwise.

I claim:

1. An adjustable mounting bracket for a camera comprising a base having suction pad attachment means for attaching it by suction to a supporting surface, a mounting for a camera, the mounting being pivotally mounted on the base and being angularly adjustable by tilting about a transverse pivotal axis relatively to the base, and clamping means for clamping the mounting platform in a desired attitude relatively to the base, said base having three suction pads pivotally attached to its periphery in a triangulated disposition for attaching the base by suction to a supporting surface, said base including a bracket structure rigidly secured thereto and projecting from the opposite side thereof, said camera mounting being pivotally mounted on the bracket structure, said camera mounting having rigidly secured thereto a clamping plate formed with an arcuate slot centered on the pivotal axis of the camera mounting, there being a screw clamp carried by the bracket structure engaged in the slot, said screw clamp, when tightened, gripping the edge of the slot to clamp the clamping plate to the bracket structure and hence to clamp the camera mounting to the base in a given attitude, said camera mounting comprising a bowl, there being a pair of parallel quadrant-shaped mounting plates attached to opposite sides of said bowl, said mounting plates being journaled in the bracket structure in bearings whose pivotal axis is perpendicular to the mounting plates, one or each of the said mounting plates constituting one of said slotted clamping plates and being provided with a screw clamp mounted on the bracket structure in engagement with its arcuate slot.

2. A mounting bracket as claimed in claim 1 in which the base comprises a U-shaped frame, and in which the bracket structure comprises a pair of spaced parallel support plates rigidly secured to the frame, and in which the quadrant-shaped mounting plates are journaled in bearings in the support plates and are located outside the pair of support plates on either side thereof and in close-spaced parallel relationship thereto.

* * * * *